United States Patent
Gaglani et al.

[11] Patent Number: 5,955,483
[45] Date of Patent: Sep. 21, 1999

[54] STABILIZATION OF BIOCIDAL ACTIVITY IN AIR DRYING ALKYDS

[75] Inventors: Kamlesh Gaglani, Belle Mead; Meihua Yang, Bridgewater; Bernard Magier, Fords, all of N.J.

[73] Assignee: Troy Technology Corporation, Florham Park, N.J.

[21] Appl. No.: 09/153,865

[22] Filed: Sep. 16, 1998

Related U.S. Application Data

[62] Division of application No. 08/752,380, Nov. 20, 1996.

[51] Int. Cl.$^6$ .................... A01N 43/40; A01N 47/10
[52] U.S. Cl. .................... 514/357; 514/491; 514/512; 514/529; 514/722
[58] Field of Search .................... 514/75, 357, 491, 514/512, 529, 722

[56] References Cited

U.S. PATENT DOCUMENTS 4,013,804  3/1977  Gruetzman .................... 427/33

*Primary Examiner*—Kriellion S. Sander
*Attorney, Agent, or Firm*—Banner & Witcoff, Ltd.

[57] ABSTRACT

This invention is directed towards stabilizing the biocidal activity of an alkyd composition containing a halopropargyl compound and a transition metal drier by use of a chelating agent.

7 Claims, 1 Drawing Sheet

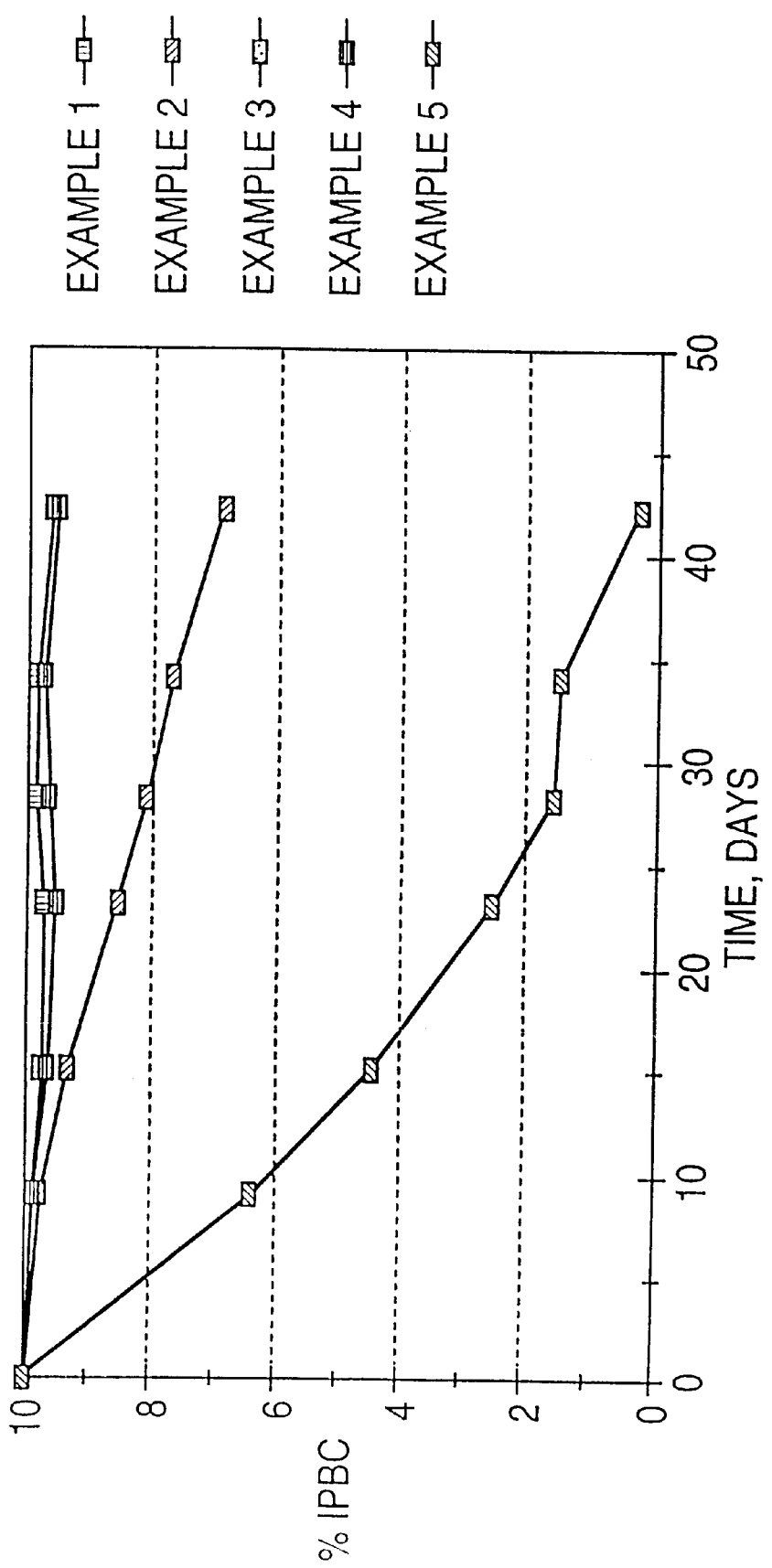

STABILIZATION OF BIOCIDAL ACTIVITY IN AIR DRYING ALKYDS

CROSS REFERENCE

This application is a divisional of U.S. patent application Ser. No. 08/752,380 filed Nov. 20, 1996 now patented.

BACKGROUND OF THE INVENTION

1. Field of the Invention

This invention is directed to alkyd compositions containing a haloalkynyl biocidal compound, and especially a halopropargyl compound, and a transition metal drier. The invention is particularly directed to such compositions which have been stabilized to reduce the loss of biocidal activity. The invention is especially directed to the stabilization of alkyd compositions containing iodopropargyl carbamates, such as 3-iodo-2-propargylbutyl carbamate, and a cobalt drier by use of a chelating agent.

2. Description of Related Art

Both exterior and interior surfaces and substrates of all types, when exposed to common environmental conditions, e.g. moisture, are prone to attack, discoloration and various kinds of destruction by a variety of species of microorganisms, including fungi, algae, bacteria and protozoa. As a result, there has always been a great need for an effective and economical means to protect, for extended periods of time, both exterior and interior surfaces and various type substrates and commercial formulations from the deterioration and destruction caused by such microorganisms.

Materials which need protection with a suitable antimicrobial composition include stucco, concrete, stone, cementaceous surfaces, wood, caulking, sealants, leather, plastics, textiles, biodegradable compositions including such materials as paints and other coating formulations, surfactants, proteins, starch-based compositions, inks, emulsions and resins as well as numerous other materials and other substances which may be attacked by destructive microbes.

Wooden objects, in particular, are subject to degradation from a wide variety of natural pests, principally insects, such as carpenter ants, powder-post beetles and termites, marine borers and fungi. Fungi are particularly prevalent and are divided into three main groups, the brown rots, white rots and soft rots. Fortunately, a variety of compositions have been developed for treating wooden objects to retard the destructive effect of such pests.

An enormously wide variety of materials have been identified which, to various degrees, are effective in retarding or preventing the growth of, and accompanying destruction caused by, such microbes. Such biocidal compounds include halogenated compounds, organometallic compounds, quaternary ammonium compounds, phenolics, metallic salts, heterocyclic amines, formaldehyde donors, organo-sulfur compounds and the like.

One of the most common ways to apply such materials to wooden objects is to include them in a composition used to coat the object. The coating, in the form of paints, lacquers and varnishes, functions as a vehicle for the biocidal agent and acts as a barrier to the natural elements, such as sunlight and precipitation. A widely used coating formulation contains an alkyd resin, an oil, an optional solvent thinner and a drier. Such compositions form dried film coatings by a combination of solvent evaporation, resin oxidation and polymerization. The process is accelerated by the drier, which typically is a transition metal compound. Cobalt is the most widely used of the transition metals in such driers. To obtain a more uniform hardening, the cobalt drier is often combined with a lead compound or calcium/zirconium mixture.

One well-known class of biocides used in such coating compositions are those containing a halopropargyl moiety, and especially an iodopropargyl moiety. Such compounds are widely disclosed in the patent literature including U.S. Pat. Nos. 3,660,499; 3,923,870; 4,259,350; 4,592,773; 4,616,004 and 4,639,460 to name a few. Included within this class of compounds are the halopropargyl carbamates which are known primarily for their fungicidal activity. 3-iodo-2-propargyl butyl carbamate, hereinafter also referred to as IPBC, is one of the best known and probably the most widely used of the halopropargyl carbamate fungicides. IPBC is a highly active broad spectrum fungicide. In addition to its fungicidal activity, IPBC also has been associated with algaecidal activity. In this regard, Great Britain Patent 2,138,292 and U.S. Pat. Nos. 4,915,909 and 5,082,722 contain such disclosures.

Haloalkynyl compounds, including halopropargyl compounds, and especially the halopropargyl carbamates, are formulated with a variety of other ingredients in both aqueous and organic solvent mixtures to form coating materials. For various reasons, it is desired that these coating compositions maintain their biocidal activity for prolonged periods of time. Unfortunately, alkyd coating compositions containing transition metal driers have sometimes been observed to experience a progressive loss in such activity.

In particular, applicants have found that the gradual loss of biocidal activity in such alkyd coating formulations discussed above is caused by a reaction between the transition metal drier in these compositions and the haloalkynyl compounds.

Applicants have discovered that adding a chelating agent to such alkyd compositions formulated with a transition metal drier, particularly a cobalt drier, and a biocidal haloalkynyl compound, including specifically halopropargyl compounds such as IPBC, significantly retards the degradation of the biocidal agent. Use of the invention also helps to ameliorate other problems, such as the formation of lacrimators and the corrosion of metal containers caused by degradation of IPBC in solvent-based alkyd paint formulations.

BRIEF DESCRIPTION OF THE INVENTION

The present invention is based, therefore, on the discovery of a composition and method for stabilizing the biocidal activity of certain alkyd formulations containing a haloalkynyl compound and a transition metal drier, particularly a cobalt drier. The invention is specifically directed to alkyd compositions and method for stabilizing the biocidal activity of a halopropargyl compound, and particularly a halopropargyl carbamate fungicide, in such compositions against a decline in biocidal activity due to the presence of a cobalt drier. The present invention stabilizes the biocidal activity of an alkyd composition containing a halopropargyl compound and a cobalt transition metal drier through the addition of a chelating agent, wherein the mole ratio of said cobalt transition metal drier and said chelating agent is between 1:1 to 1:8.

The present invention also provides a method for stabilizing an alkyd formulation containing a halopropargyl compound, said formulation containing an amount of a transition metal drier sufficient to cause degradation of said halopropargyl compound, which comprises adding a sufficient amount of a chelating agent to said formulation to retard reaction between the transition metal drier and the halopropargyl compound.

BRIEF DESCRIPTION OF THE DRAWING

FIG. 1 graphically presents the stability of IPBC in the formulations of Examples 1 through 5.

DETAILED DESCRIPTION OF THE INVENTION

The present invention is directed to an alkyd composition and a method for stabilizing alkyd formulations containing a haloalkynyl compound and a transition metal drier, particularly a cobalt drier. The invention is specifically directed to an alkyd composition and a method for reducing the degradation of halopropargyl compounds, particularly a halopropargyl carbamate such as IPBC, in aqueous- or organic solvent-based alkyd formulations, caused by the presence of a degradation-causing amount of a cobalt transition metal drier. The invention thus provides for stabilized alkyd compositions containing a biocidal halopropargyl compound and a cobalt transition metal drier.

Alkyd resins used for preparing the compositions of the present invention are those resins widely known to those skilled in the art. Such resins are thermosetting polymers similar to polyester resins and typically comprise the condensation product of a polybasic acid, such as phthalic anhydride, and a polyhydric alcohol, such as ethylene glycol, glycerol or pentaerythritol, usually with a drying oil modifier. The present invention is not to be limited to any particular class of alkyds and is broadly applicable to any alkyd-type resin which utilizes a transition metal compound to accelerate resin film formation and drying.

Typical driers used in the industry for accelerating the drying or hardening of oxidizable alkyd coatings include transition metals such as cobalt or combinations of transition metals with other non-transition metals such as a combination of cobalt and either lead or calcium/zirconium. Other transition metals that can be used for accelerating the drying of alkyd compositions can be found in groups IB, VIIB and VIII of the periodic table of the elements. While not all of these metals have as strong an adverse impact on the stability of haloalkynyl biocides as does cobalt, the present invention provides a composition and method for ameliorating any degradation caused by their interaction. Since cobalt has been observed to cause the most drastic loss in activity of the haloalkynyl biocides, and particularly IPBC, and it also happens to be the drier used most widely commercially, the present invention will be described principally in that context. Those skilled in the art will recognized the applicability and adaptability of the following disclosure to alkyd formulations containing other transition metal driers, however.

The transition metal driers generally comprise an oil-soluble salt of the transition metal, and often a fatty acid salt. Common transition metal driers are cobalt octoate and cobalt naphthenate. Applicants have discovered that transition metals react with halopropargyl compounds and cause degradation of the biocidal compounds. The degradation of the active halopropargyl compound results in a loss of biocidal activity in alkyd formulation containing a transition metal drier.

A halopropargyl compound for use in the present invention can be identified by the following structure:

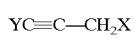

wherein Y is a halogen, preferably iodine and X can be (1) oxygen which is part of an organic functional group; (2) nitrogen which is part of an organic functional group; (3) sulfur which is part of an organic functional group; or (4) carbon which is part of an organic functional group.

The functional group of which oxygen is a part is preferably an ether, ester, or carbamate group. The functional group of which nitrogen is a part is preferably an amine, amide, urea, nitrile, or carbamate group. The functional group of which sulfur is a part is preferably a thiol, thiane, sulfone, or sulfoxide group. The organic functional group of which carbon is a part is preferably an ester, carbamate or alkyl group.

Examples of compounds which may be used as the halopropargyl compound of this invention are especially the fungicidally active iodopropargyl derivatives. In this regard, please see U.S. Pat. Nos. 3,923,870, 4,259,350, 4,592,773, 4,616,004, 4,719,227, and 4,945,109, the disclosures of which are herein incorporated by reference. These iodopropargyl derivatives include compounds derived from propargyl or iodopropargyl alcohols such as the esters, ethers, acetals, carbamates and carbonates and the iodopropargyl derivatives of pyrimidines, thiazolinones, tetrazoles, triazinones, sulfamides, benzothiazoles, ammonium salts, carboxamides, hydroxamates, and ureas. Preferred among these compounds is the halopropargyl carbamate, 3-iodo-2-propynyl butyl carbamate (IPBC). This compound is included within the broadly useful class of compounds having the generic formula:

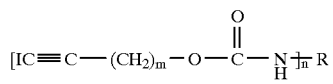

Wherein R is selected from the group consisting of hydrogen, substituted and unsubstituted alkyl groups having from 1 to 20 carbon atoms, substituted and unsubstituted aryl, alkylaryl, and aralkyl groups having from 6 to 20 carbon atoms and from substituted and unsubstituted cycloalkyl and cycloalkenyl groups of 3 to 10 carbon atoms, and m and n are independently integers from 1 to 3, i.e., m and n are not necessarily the same.

Particularly preferred are formulations of such halopropargyl carbamates where m is 1 and n is 1 having the following formula:

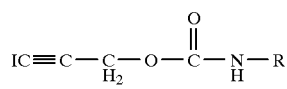

Suitable R substituents include alkyls such as methyl, ethyl, propyl, n-butyl, t-butyl, pentyl, hexyl, heptyl, octyl, nonyl, decyl, dodecyl, octadecyl, cycloalkyls such as cyclohexyl, aryls, alkaryls and aralkyls such as phenyl, benzyl, tolyl, cumyl, halogenated alkyls and aryls, such as chlorobutryl and chlorophenyl, and alkoxy aryls such as ethoxyphenyl and the like.

Especially preferred are such iodopropargyl carbamates as 3-iodo-2-propynyl propyl carbamate, 3-iodo-2-propynyl butyl carbamate, 3-iodo-2-propynyl hexyl carbamate, 3-iodo-2-propynyl cyclohexyl carbamate, 3-iodo-2-propynyl phenyl carbamate, and mixtures thereof.

The amount of the halopropargyl compound and cobalt transition metal drier in alkyd formulations which are stabilized in accordance with the present invention can vary widely and an optimum amount generally is affected by the intended application and other components of a particular formulation. In any event, generally such alkyd formulations contain anywhere from about 0.05 to about 1.0 percent by weight of such halopropargyl compound and from about 0.005 to about 0.15 percent by weight of such cobalt transition metal drier. Usually, such alkyd formulations contain from 0.1 to 0.6 percent by weight of such halopropargyl compound and from 0.01 to 0.06 percent by weight of such cobalt transition metal drier. Such alkyd formulations, protected against microbial attack by the inclusion of a halopropargyl carbamate, can be prepared from highly concentrated compositions of the halopropargyl active ingredients, such as by appropriate dilution. Oftentimes, the optimum range of the halopropargyl carbamate is about 0.05% to 1.0%.

Alkyd compositions of the present invention will generally be formulated by mixing the halopropargyl active ingredient or a concentrate of the halopropargyl compound, in the liquid vehicle for the alkyd resin for dissolving or suspending the active component. As noted, the composition also will be provided with one or more transition metals as adjuvants which are conventionally employed as driers in the compositions.

The key constituent of the present invention is a chelating agent for enhancing the stability of the haloalkynyl biocide in the alkyd composition containing a transition metal drier. Any compound having ligands which can form coordinate bonds with a transition metal is potentially useful as a chelating agent in the present invention.

Suitable chelating agents which can be used to stabilize alkyd compositions containing a halopropargyl compound and transition metal drier thus include, but are not limited to, ethylenediaminetetraacetic acid (EDTA), ethylenediamine, acetylacetone, nitrilotriacetic acid, ethylene glycol-bis(β-aminoethyl ether)-N,N-tetraacetic acid, 2,2'-bipyridine, 1,10-phenanthroline, substituted ethylenediamine (both on nitrogen and carbon e.g. N,N,N', N'-tetramethyl ethylenediamine), 2-and 8-hydroxyquinoline and their substituted derivatives e.g. 8-hydroxyquinaldine, 2-hydroxy-4-methylquinaldine, 5-chloro-8-hydroxyquinoline, 5,7-dichloro-8-hydroxyquinoline, 2,4-quinolinediol; 2- and 8-quinolinethiol and its derivatives; 8-aminoquinoline and its derivatives; substituted 2,2'-bipyridine e.g. 4,4'-dimethyl-2,2'-dipyridyl, 2,2':6',2"-terpyridine, 4,4'-diphenyl-2,2'-dipyridyl, 2,2'-dipyridine-3,3'-diol; substituted 1,10-phenanthroline derivatives e.g. 4-methyl-1,10-phenanthroline, 5-methyl-1,10-phenanthroline, 4,7-dimethyl-1,10-phenanthroline, 5,6-dimethyl-1,10-phenanthroline, 3,4,7,8-tetramethyl-1,10-phenanthroline, 4,7-diphenyl-1,10-phenanthroline, 2,9-dimethyl-4,7-dimethyl- 1,10-phenanthroline; 2,2'-biquinoline; 2-quinoxalinol; 3-methyl-2-quinoxalinol; 2,3-dihydroxyquinoxaline; 2-mercaptopyridine; 2-dimethylaminopyridine; 1,2-bis(dimethylphosphino) ethane; 1,2-bis(diethylphosphino) ethane; 1,2-bis (diphenylphosphino) ethane; 1,3-bis(diphenylphosphino) propane; and 1,4-bis(diphenylphosphino) butane.

According to the invention a sufficient amount of chelating agent is added to the halopropargyl compound and cobalt transition metal drier containing alkyd composition to inhibit the loss of biocidal activity of the alkyd formulation. A sufficient amount of chelating agent is an amount effective to inhibit or retard the degradation of the halopropargyl compound in the alkyd formulation. The amount of chelating agent added should be sufficient to stabilize the halopropargyl compound as well as not significantly interfere with the drier activity of the transition metal compound for the specific application of the end-use formulation. An amount of chelating agent can be determined by routine testing of the stability of the halopropargyl compound in the presence of the transition metal in the alkyd formulation with varying amounts of added chelating agent. Methods for assaying stability of the halopropargyl compound are known and available to one skilled in the art. The amount of chelating agent needed in a particular alkyd composition is related to the amount of transition metal drier present in the formulation. Usually a sufficient amount of chelating agent will be from about 1 to about 8 moles of chelating agent per mole transition metal drier in the formulation. More preferably, the mole ratio of the chelating agent and the transition metal drier is from about 1:1 to about 6:1.

Compositions of the present invention may also include a liquid vehicle, such as for solubilizing the haloalkynyl biocide and/or reducing the viscosity of the formulation. Useful liquid vehicles, including organic solvents for the halopropynyl compound, particularly the preferred iodopropynyl butyl carbamate, are water, alcohols, such as methanol, butanol and octanol, glycols, several glycol ethers like propylene glycol n-butyl ether, propylene glycol tert-butyl ether, 2-(2-methoxymethylethoxy)-tripropylene glycol methyl ether, propylene glycol methyl ether, dipropyleneglycol methyl ether, tripropylenelene glycol methyl ether, propylene glycol n-butyl ether and the esters of the previously mentioned compounds. Other useful solvents are n-methyl pyrrolidone, n-pentyl propionate, 1-methoxy-2-propanol, dibasic esters of several dicarboxylic acids and mixtures thereof, such as the dibasic isobutyl ester blend of succinic, glutaric and adipic acids, aromatic hydrocarbons, such as xylene and toluene, high aromatic petroleum distillates, e.g., solvent naphtha, distilled tar oil, mineral oils, ketones such as acetone, and petroleum fractions such as mineral spirits and kerosene. Other suitable organic solvents are well known to those skilled in the art.

When preparing alkyd formulations of the present invention for specific applications, the composition also will likely be provided with other adjuvants conventionally employed in compositions intended for such applications such as additional fungicides, auxiliary solvents, processing additives, plasticizers, UV-stabilizers or stability enhancers, water soluble or water insoluble dyes, color pigments, corrosion inhibitors, anti-settlement agents, anti-skinning agents and the like. Additional fungicides used in the composition are preferably soluble in the liquid vehicle.

As noted above, the chelating agent is added to an alkyd formulation containing a halopropargyl compound and a transition metal drier. In the absence of such chelating additive, the halopropargyl compound and the transition metal drier would react with each other and cause a premature degradation of the biocidal activity of the halopropargyl compound. The chelating agent is added in a sufficient amount to counteract any reaction between the halopropargyl compound and the transition metal.

A particularly preferred aspect of the present invention relates to a composition containing a halopropargyl compound and a chelating agent, as described above, which can be sold as a concentrate and which is useful as the biocidal additive for introducing the halopropargyl compound, and especially IPBC, into end-use alkyd formulations containing one or more transition metal driers for providing a stable biocidal activity. Generally, such a concentrate comprises a mixture of the halopropargyl compound and a chelating agent in a weight ratio of halopropargyl compound to a chelating agent in the range of 1:1 to 8:1. Such a concentrate is useful for imparting biocidal activity to the end-use alkyd formulation. Throughout the specification and claims, the term "end-use formulation" is intended to embrace the wide variety of formulations which have used halopropargyl compounds for imparting biocidal activity including paints, stains and other alkyd-based coatings.

The following examples are presented to illustrate and explain the invention. Unless otherwise indicated, all references to parts and percentages here and throughout the application are based on weight.

EXAMPLES

Examples 1–5 demonstrate the degradation of haloalkynyl compounds caused by co-ordination of transition metals to the alkyne. In particular, the stability of 3-iodo-2-propynyl butylcarbamate (IPBC) in a solvent of Dowanol PnB (Dow Chemical Corporation) was examined as this solvent is widely used in the paints and coatings industry and provides the solubility of IPBC and the transition metal driers commonly used. The driers chosen for this investigation were the calcium, manganese, cobalt and zirconium octoates widely used in the industry. The first example serves as a control and illustrates the stability of IPBC in the solvent, Dowanol PnB. Examples 2–5 illustrate the stability of IPBC in presence of various transition metal driers. The data demonstrates the dramatic effect that a cobalt drier in particular, has on the stability of IPBC. These results are graphically presented in FIG. 1.

Example 1

A 10% solution of IPBC was prepared by dissolving 5.0 g Troysan Polyphase$^R$ P100 in 45.0 g Dowanol PnB. The solution was heat aged at 45° C. for six weeks and was analyzed for the IPBC content at about one week intervals by HPLC. The results are presented in Table 1.

TABLE 1

Stability of IPBC in Dowanol PnB at 45° C.

| Time in Days | 0 | 9 | 15 | 23 | 28 | 34 | 42 |
|---|---|---|---|---|---|---|---|
| % IPBC | 10 | 9.9 | 9.8 | 9.8 | 9.9 | 9.9 | 9.7 |

Example 2

A solution of IPBC was prepared by dissolving 5.0 g Troysan Polyphase$^R$ P100 in 44.17 g Dowanol PnB. To this solution was added 0.83 g Troymax Manganese$^R$ 6% and the resulting solution was aged at 45° C. for six weeks and was analyzed for the IPBC content at about one week intervals. The results are presented in Table 2.

TABLE 2

Stability of IPBC in the presence of Manganese drier at 45° C.

| Time in Days | 0 | 9 | 15 | 23 | 28 | 34 | 42 |
|---|---|---|---|---|---|---|---|
| % IPBC | 10 | 9.8 | 9.4 | 8.6 | 8.1 | 7.7 | 6.9 |

Example 3

A solution of IPBC was prepared by dissolving 5.0 g Troysan Polyphase$^R$ P100 in 44.17 g Dowanol PnB. To this solution was added 0.83 g Troymax Zirconium$^R$ 6% and the resulting solution was aged at 45° C. for six weeks and was analyzed for the IPBC content at about one week intervals. The results are presented in Table 3.

TABLE 3

Stability of IPBC in the presence of Zirconium drier at 45° C.

| Time in Days | 0 | 9 | 15 | 23 | 28 | 34 | 42 |
|---|---|---|---|---|---|---|---|
| % IPBC | 10 | 9.9 | 9.7 | 9.6 | 9.7 | 9.8 | 9.6 |

Example 4

A solution of IPBC was prepared by dissolving 5.0 g Troysan Polyphase$^R$ P100 in 44.17 g Dowanol PnB. To this solution was added 0.83 g Troymax Calcium$^R$ 6% and the resulting solution was aged at 45° C. for six weeks and was analyzed for the IPBC content at about one week intervals. The results are presented in Table 4.

TABLE 4

Stability of IPBC in the presence of Calcium drier at 45° C.

| Time in Days | 0 | 9 | 15 | 23 | 28 | 34 | 42 |
|---|---|---|---|---|---|---|---|
| % IPBC | 10 | 9.9 | 9.7 | 9.6 | 9.7 | 9.8 | 9.7 |

Example 5

A solution of IPBC was prepared by dissolving 5.0 g Troysan Polyphase$^R$ P100 in 44.17 g Dowanol PnB. To this solution was added 0.83 g Troymax Cobalt$^R$ 6% and the resulting solution was aged at 45° C. for six weeks and was analyzed for the IPBC content at about one week intervals. The results are presented in Table 5.

TABLE 5

Stability of IPBC in the presence of Cobalt drier at 45° C.

| Time in Days | 0 | 9 | 15 | 23 | 28 | 34 | 42 |
|---|---|---|---|---|---|---|---|
| % IPBC | 10 | 6.4 | 4.5 | 2.6 | 1.7 | 1.6 | 0.4 |

Example 6

In this example, the stability of IPBC was evaluated in several alkyd formulations with a cobalt drier (Recipe B) and without a cobalt driver (Recipe A). The results clearly indicate that the stability of IPBC is strongly influenced by the presence of cobalt metal.

A series of alkyd compositions were prepared by using the following general recipe A:

Recipe A

| Alkyd Resin | 60.0% |
|---|---|
| IPBC | 0.5% |
| Dowanol PnB | 1.3% |
| Methylethylketoxime | 0.2% |
| Mineral Spirits | 38.0% |

A series of alkyd compositions were prepared by using the following general recipe B:

Recipe B

| Alkyd Resin | 60.0% |
|---|---|
| IPBC | 0.5% |
| Dowanol PnB | 1.3% |
| Methylethylketoxime | 0.2% |

-continued

| | |
|---|---|
| Mineral Spirits | 37.5% |
| Cobalt Drier 6% | 0.5% |

The alkyds prepared as above were heat aged at 45° C. for four weeks and analyzed for residual IPBC by HPLC at one week intervals. The results are presented in Table 6.

TABLE 6

Stability of IPBC at 45° C. in various alkyd formulations.

| | Residual % IPBC | | | | |
|---|---|---|---|---|---|
| Alkyd Resin | Initial | 1 Week | 2 Weeks | 3 Weeks | 4 Weeks |
| Recipe A | | | | | |
| Cargill 50-5070 | 0.55 | 0.52 | 0.5 | 0.47 | 0.47 |
| Duramac 2033 | 0.5 | 0.55 | 0.5 | 0.51 | 0.51 |
| Drisoy G-1 | 0.5 | 0.53 | 0.5 | 0.51 | 0.51 |
| Admerol 75-M-70 | 0.53 | 0.49 | 0.51 | 0.5 | 0.5 |
| Finnresin TA 8200 | 0.48 | 0.49 | 0.45 | 0.48 | 0.49 |
| Recipe B | | | | | |
| Cargill 50-5070 | 0.56 | 0.02 | ND[1] | ND | ND |
| Duramac 2033 | 0.5 | 0.02 | ND | ND | ND |
| Drisoy G-1 | 0.54 | 0.06 | ND | ND | ND |
| Amerol 75-M-70 | 0.5 | ND | ND | ND | ND |
| Finnresin TA 8200 | 0.67 | 0.04 | ND | ND | ND |

[1]None detected

Example 7

This example demonstrates that using a chelating agent, in particular, 1,10-phenanthroline and 2,2'-bipyridine, which form coordinate bonds specifically with cobalt, substantially improves the stability of IPBC in various alkyd formulations.

A series of alkyd compositions without a chelating agent were prepared according to the recipe C as follows:

Recipe C

| | |
|---|---|
| Alkyd Resin (100% solids basis) | 40.0% |
| Troysan Polyphase[R] P100 | 0.5% |
| Methylethylketoxime | 0.2% |
| Troymax Cobalt, 6% | 0.27% |
| Troymax Zirconium, 12% | 0.83% |
| Mineral spirits | 58.2% |

A series of alkyd compositions with a chelating agent were prepared according to the recipe D as follows:

Recipe D

| | |
|---|---|
| Alkyd Resin (100% solids basis) | 40.0% |
| Troysan Polyphase[R P100] | 0.5% |
| Methylethylketoxime | 0.2% |
| Troymax Cobalt, 6% | 0.27% |
| Troymax Zirconium, 12% | 0.83% |
| Mineral spirits | 58.135% |
| 2,2'-Bipyridine | 0.065% |

A series of alkyd compositions with a chelating agent were prepared according to the recipe E as follows:

Recipe E

| | |
|---|---|
| Alkyd Resin (100% solids basis) | 40.0% |
| Troysat Polyphase[R] P100 | 0.5% |
| Methylethyketoxime | 0.2% |
| Troymax Cobalt, 6% | 0.27% |
| Troymax Zirconium, 12% | 0.83% |
| Mineral spirits | 58.122% |
| 1,10-Phenanthroline | 0.078% |

The above recipe C, D and E formulations were heat aged at 45° C. and analyzed at one week intervals for four weeks for the amount of IPBC by HPLC. The results of this stability study are presented in Table 7.

TABLE 7

Stability of IPBC in various alkyds.

| | Residual % IPBC | | | | |
|---|---|---|---|---|---|
| Alkyd Resin | Initial | 1 Week | 2.5 Weeks | 3 Weeks | 4 Weeks |
| Recipe C | | | | | |
| Cargill 50-5070 | 0.44 | 0.39 | — | — | 0.01 |
| Duramac 2033 | 0.46 | 0.2 | — | — | None Detected |
| Drisoy G-1 | 0.36 | 0.27 | None Detected | — | None Detected |
| Admerol 75-M-70 | 0.44 | 0.44 | — | — | None Detected |
| Finnresin TA-8200 | 0.43 | 0.26 | — | — | 0.15 |
| Rion R 737.7 | 0.42 | 0.36 | — | — | 0.1 |
| Recipe D | | | | | |
| Drisoy G-1 | 0.35 | 0.36 | 0.34 | — | 0.3 |
| Finnresin TA-8200 | 0.42 | 0.49 | 0.46 | — | 0.46 |
| Rion R 737.7 | 0.5 | — | 0.45 | — | 0.49 |
| Recipe E | | | | | |
| Cargill 50-5070 | 0.47 | 0.46 | — | — | 0.31 |
| Duramac 2033 | 0.45 | — | 0.36 | — | 0.26 |
| Drisoy G-1 | 0.35 | 0.38 | 0.37 | — | 0.31 |
| Admerol 75-M-70 | 0.46 | 0.46 | — | — | 0.24 |

While certain specific embodiments of the invention have been described with particularity herein, it will be recognized that various modifications thereof will occur to those skilled in the art and it is to be understood that such modifications and variations are to be included within the preview of this application and the spirit and scope of the appended claims. In particular, chelating agents useful in the present invention include any material which can form coordination complexes with transition metals and thus protect alkynes from degradation.

We claim:

1. A biocidal concentrate comprising a mixture of a halopropargyl compound and a chelating agent, wherein the weight ratio of said halopropargyl compound to said chelating agent is between 1:1 to 8:1 and wherein said concentrate is useful for providing biocidal activity to an alkyd formulation containing a transition metal drier and for stabilizing the alkyd formulation against degradation of said halopropargyl compound.

2. The biocidal concentrate of claim 1 wherein the halopropargyl compound is an iodopropargyl derivative selected from an iodopropargyl ester, an iodopropargyl ether, an iodopropargyl acetal, an iodopropargyl carbamate and an iodopropargyl carbonate.

3. The biocidal concentrate of claim 2 wherein the iodopropargyl carbamate has the formula:

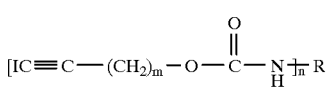

where R is selected from the group consisting of hydrogen, substituted and unsubstituted alkyl groups having from 1 to 20 carbon atoms, substituted and unsubstituted aryl, alkylaryl, and aralkyl groups having from 6 to 20 carbon atoms and from substituted and unsubstituted cycloalkyl and cycloalkenyl groups of 3 to 10 carbon atoms.

4. The biocidal concentrate of claim 3 wherein the transition metal is cobalt.

5. The biocidal concentrate of claim 4 wherein the chelating agent is selected from the group consisting of ethylenediaminetetraacetic acid, ethylenediamine, acetylacetone, nitrilotriacetic acid, ethyleneglycol-bis(β-aminoethyl ether)-N,N-tetraacetic acid, 2,2'-bipyridine, 1,10-phenanthroline, N,N,N',N'-tetramethyl ethylenediamine, 2-hydroxyquinoline, 8-hydroxyquinoline, 8-hydroxyquinaldine, 2-hydroxy-4-methylquinaldine, 5-chloro-8-hydroxyquinoline, 5,7-dichloro-8-hydroxyquinoline, 2,4-quinolinediol, 2-quinolinethiol, 8-quinolinethiol, 8-aminoquinoline, 4,4'-dimethyl-2,2'-dipyridyl, 2,2':6',2"-terpyridine, 4,4'-diphenyl-2,2'-dipyridyl, 2,2"-dipyridine-3,3'-diol, 4-methyl-1,10-phenanthroline, 5-methyl-1,10-phenanthroline, 4,7-dimethyl-1,10-phenanthroline, 5,6-dimethyl-1,10-phenanthroline, 3,4,7,8-tetramethyl-1,10-phenanthroline, 4,7-diphenyl-1,10-phenanthroline, 2,9-dimethyl-4,7-diphenyl-1,10-phenanthroline, 2,2'-biquinoline, 2-quinoxalinol, 3-methyl-2-quinoxalinol, 2,3-dihydroxyquinoxaline, 2-mercaptopyridine, 2-dimethylaminopyridine, 1,2-bis(dimethylphosphino)ethane, 1,2-bis(diethylphosphino)ethane, 1,2-bis(diphenylphosphino)ethane, 1,3-bis(diphenylphosphino)propane, and 1,4-bis(diphenylphosphino)butane.

6. The biocidal concentrate of claim 5 wherein the iodopropargyl carbamate is selected from the group consisting of 3-iodo-2-propynyl propyl carbamate, 3-iodo-2-propynyl butyl carbamate, 3-iodo-2-propynyl hexyl carbamate, 3-iodo-2-propynyl cyclohexyl carbamate, 3-iodo-2-propynyl phenyl carbamate, and mixtures thereof.

7. The biocidal concentrate of claim 6, wherein the iodopropargyl carbamate is 3-iodo-2-propynyl butyl carbamate and the chelating agent is 2,2'-bipyridine.

* * * * *

UNITED STATES PATENT AND TRADEMARK OFFICE
CERTIFICATE OF CORRECTION

PATENT NO. : 5,955,483

DATED : September 21, 1999

INVENTOR(S) : Kamlesh GAGLANI, *et al.*

It is certified that error appears in the above-identified patent and that said Letters Patent is hereby corrected as shown below:

ON THE TITLE PAGE

Item [56] References Cited:

under U.S. PATENT DOCUMENTS, insert:

--3,600,408   08/1971   Bursack, et al.
  4,977,186   12/1990   Gruening
  5,071,479   12/1991   Gruening--;

below the U.S. PATENT DOCUMENTS section, insert:

--FOREIGN PATENT DOCUMENTS

2 138 292   10/1984   United Kingdom
2 140 299   11/1984   United Kingdom--.

Signed and Sealed this

Seventeenth Day of April, 2001

*Attest:*

NICHOLAS P. GODICI

*Attesting Officer*    *Acting Director of the United States Patent and Trademark Office*

UNITED STATES PATENT AND TRADEMARK OFFICE
CERTIFICATE OF CORRECTION

PATENT NO. : 5,955,483
DATED : September 21, 1999
INVENTOR(S) : Kamlesh Gaglani, et al.

It is certified that error appears in the above-identified patent and that said Letters Patent is hereby corrected as shown below:

Title page,
Item [73] Assignee, delete "Troy Technology Corporation, Florham Park, N.J." and insert -- Troy Technology Corporation, Inc., Wilmington, Del. --;

Signed and Sealed this

Ninth Day of October, 2001

*Attest:*

NICHOLAS P. GODICI
*Attesting Officer*     *Acting Director of the United States Patent and Trademark Office*